Oct. 17, 1944.　　B. H. FOSTER ET AL　　2,360,485
COUPLING
Filed Oct. 15, 1942
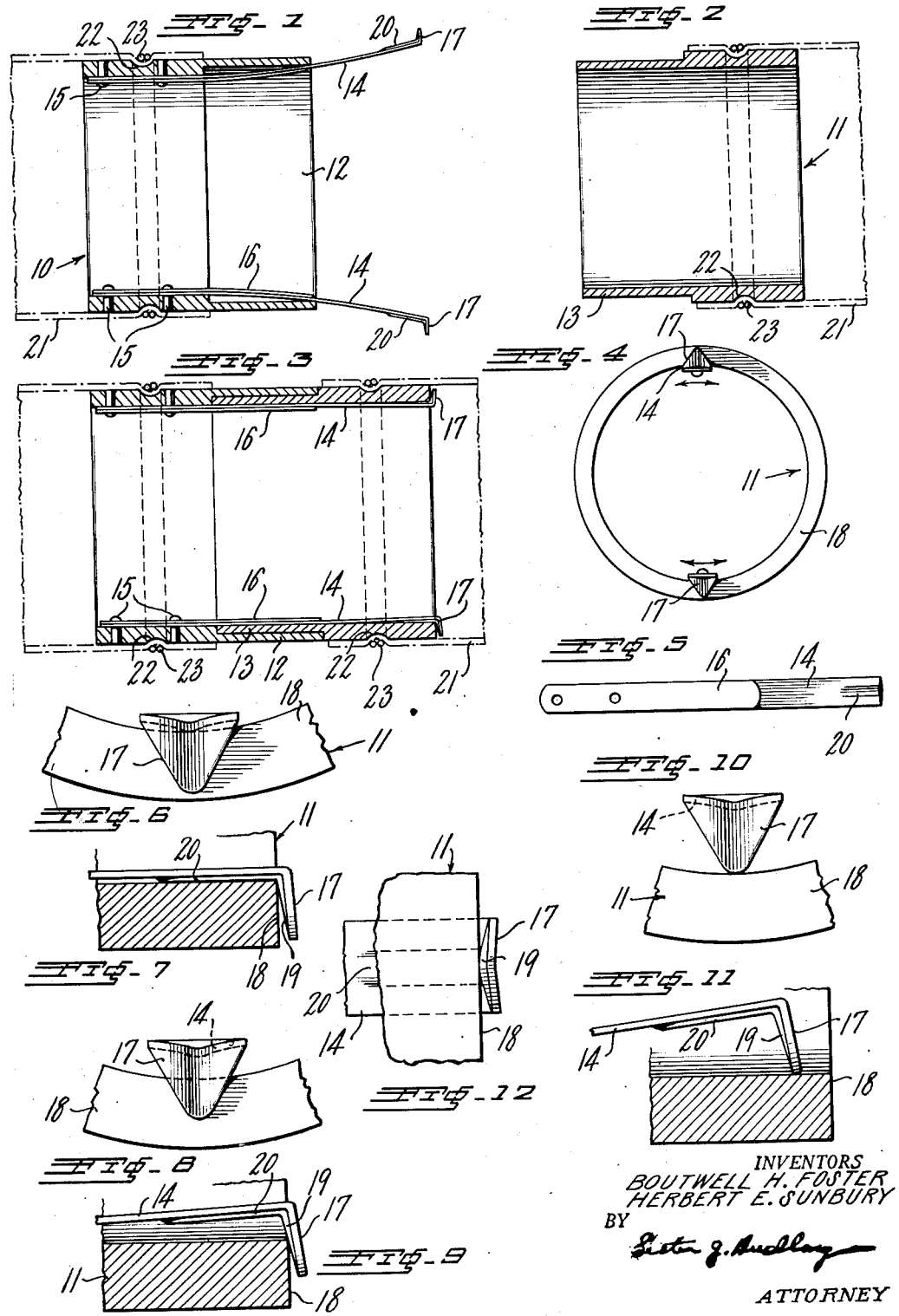
INVENTORS
BOUTWELL H. FOSTER
HERBERT E. SUNBURY
BY
ATTORNEY Patented Oct. 17, 1944

2,360,485

UNITED STATES PATENT OFFICE 2,360,485

COUPLING

Boutwell H. Foster, Maplewood, and Herbert E. Sunbury, Rutherford, N. J., assignors to United States Rubber Company, New York, N. Y., a corporation of New Jersey Application October 15, 1942, Serial No. 462,168

1 Claim. (Cl. 285—174)

This invention relates to couplings comprising a pair of interfitted sleeves having latch means associated therewith for locking the sleeves together.

Couplings having various types of latch means for holding the parts together have been proposed heretofore, but when the latch means employed heretofore have operated positively to lock the parts together, it has usually been necessary to provide means whereby the latch can be manually released when the parts are to be separated.

The present invention contemplates simple and inexpensive latch means for positively locking the sleeves together and which may be quickly and easily released by simply rotating one sleeve relative to the other slightly while pulling the sleeves apart.

The present construction has been developed more particularly for use in couplings formed of light-weight non-metallic sleeves which are more fragile than metal, and therefore cannot be cut and notched to the same degree as metal without unduly weakening the fragile parts. The present construction, however, may be employed for positively locking metal or other coupling parts together.

One important advantage of the present construction is that it may be employed without the necessity of cutting away or reducing the strength of either of the sleeves of the coupling. Another advantage resides in the construction whereby the sleeves may be quickly and easily locked together by simply moving one axially into interfitted relation with the other without the necessity of turning one sleeve relative to the other into particular alignment. Another extremely important advantage of the present construction resides in means whereby the sleeves may be firmly locked together so that they will not pull apart but may be easily and quickly separated by simply grasping a sleeve in each hand and rotating one relatively to the other slightly while exerting a separating pull upon the sleeves.

The above and other advantages of the present invention and novel arrangement of parts will be more fully understood from the following description when read in connection with the accompanying drawing illustrating one good practical embodiment of the invention.

In the drawing:

Fig. 1 is a longitudinal sectional view through one of the sleeves of the present coupling;

Fig. 2 is a similar view through the other sleeve of this coupling;

Fig. 3 is a longitudinal sectional view through the two sleeves of the coupling in their assembled relation;

Fig. 4 is an end view of the coupling of Fig. 3;

Fig. 5 is a face view of a blade spring to be described;

Fig. 6 is an end view and Fig. 7 is a sectional view, on a larger scale, through part of the coupling showing the locking spring in its locking position;

Figs. 8 and 9 are similar views showing the locking spring moved part way towards the sleeve releasing position;

Figs. 10 and 11 are similar views showing the spring out of locking engagement with the sleeve and resting against the cylindrical inner face of the sleeve; and Fig. 12 is a face view of part of one sleeve with the locking spring in locking engagement therewith.

The coupling locking means contemplated by the present invention may be employed upon various types of couplings formed of interfitted sleeves provided the sleeves when fitted together may be rotated one relative to the other, and these sleeves may be formed of plastics, paper compounds, metal and other relatively rigid materials.

In the embodiment of the invention illustrated the coupling comprises the interfitted sleeves 10 and 11, preferably formed of a non-metallic rigid material such as paper treated with Bakelite. The sleeve 10 has its bore increase in size as at 12 for some distance to snugly receive the portion of the sleeve 11 that is reduced in diameter as at 13 to fit within the portion 12 as will be apparent from Fig. 3. The construction of these interfitted sleeves is such that the parts 12 and 13 fit one within the other telescopically and the parts may be rotated one within the other, and may be moved axially one relatively to the other unless prevented by the locking means which will now be described.

The locking means of the present invention is constructed for positively locking the sleeves 10 and 11 together so that they cannot be separated by a direct longitudinal pull upon one relative to the other but can be quickly and easily separated by rotating one slightly relative to the other during such longitudinal pull.

The locking means illustrated comprises the blade springs 14, two being shown in the drawing as secured to the inner wall of the sleeve 10 diametrically opposite each other. Each of these flat springs has a bowed construction as will be apparent from Fig. 1 so that the outer free ends of these springs tend to spread away from each other. Each spring 14 is shown as rigidly secured to the inner wall of the sleeve 10 by the rivets 15, and it may be desirable to increase the pressure of the outer ends of the springs 14 outwardly away from each other by associating with each spring a shorter reinforcing blade spring 16.

Each spring 14 is provided at its outer end with a laterally extending lip or projection 17 which is conveniently formed by bending the end portion of the blade spring 14 outwardly at an approximately right angle. The angle which this lip or projection forms with the outer end surface 18 of the sleeve 11 is extremely important since if the underface 19 of this lip, which rests upon the surface 18, lies parallel to the surface 18, it will be impossible to separate the sleeves by the combined pulling and turning movement herein contemplated, and on the other hand, if the underface 19 of the lip 17 forms an angle of more than several degrees with the surface 18, the sleeves will not be positively locked together and will separate under a direct separating pull of one relative to the other.

The essential feature of the present invention resides in the construction in which the underface 19 of each lip 17 is inclined to the surface 18 of the sleeve 11 to such a slight extent that these springs 14 will not release the sleeves under a direct separating pull but will release the sleeves when such direct pull is supplemented by a rotation of one sleeve relative to the other. This rotation in either direction serves to increase the tendency of the slightly inclined lips 17 to slide inwardly upon the surface 18 to the sleeve releasing position of Figs. 10 and 11. The angle at which the underface 19 inclines to the surface 18 may vary from about 1 to 8 degrees, depending upon the stiffness of the springs 14 and the freedom with which the lip 17 slides on the surface 18.

The manner in which the springs 14 are forced inwardly to the sleeve releasing position under the combined action of a separating pull and rotation of one sleeve relative to the other will be clearly understood from an examination of Figs. 6 and 7 of the drawing in which the lip 17 is shown in full locking engagement with the sleeve surface 18, and then observing Figs. 8 and 9 in which the lip is shown as approaching the releasing position, and then noting Figs. 10 and 11 in which the spring is shown as entirely out of engagement with the surface 18 of the sleeve 11.

In the construction shown the lip 17 is somewhat V-shaped in appearance and has its outer nose rounded so that it will slide upon the inner face of the sleeve 11 without digging into the same, and this lip 17 may be bowed slightly in cross-section as best shown in Fig. 12 so that the underface 19 will slide smoothly upon the surface 18 of the sleeve without digging into the same. It will also be noted that the outer shank portion of the spring 14 may, if desired, be provided with the rib or bead 20 as best shown in Fig. 11 since this will increase the stiffness of the shank portion of the spring and will prevent the edges of the blade spring 14 from coming into direct contact with the inner curved surface of the sleeve 11 as will be apparent from Fig. 6. The spring 14 may be given the construction just described by a stamping operation adapted to form the bead 20 and curved outwardly bent lip 17, and after such stamping operation the spring may be tempered to impart to the same the desired resilient properties.

It will be apparent from the foregoing that the interfitted sleeves 10 and 11 can be easily and quickly locked together as shown in Fig. 3 by simply pressing the bowed springs 14 inwardly towards each other sufficiently to enter the bore of the sleeve 11 whereupon the male portion 13 of the sleeve 11 may be slid into the female portion 12 of the sleeve 10 until the portion 13 is fully inserted. The springs 14 will then snap into the locking position in which they are shown in Fig. 3 to hold the sleeves against separation by direct axial pull.

Were it not for the novel construction above described whereby the sleeves may be separated by a slight rotation of one relative to the other while exerting a separating pull upon the sleeves, it would be extremely difficult to disconnect the sleeves if the springs 14 positively locked them together, particularly if the outer ends of these springs are located within some enclosing member which prevents manual access to the springs 14. To illustrate this the sleeves 10 and 11 are shown as having associated therewith in dot and dash lines the tubular members 21 which may be firmly secured to each of the sleeves 10 and 11 by providing each of these sleeves with a shallow annular groove 22 adapted to form a depression in which a cord or fastening means 23 secured about the tube 21 may lie. The fabric tube 21 is sufficiently flexible to permit a slight rotation to be imparted to one or the other coupling sleeves 10 and 11 while they are subjected to a separating pull to thereby release the latch springs 14.

It will be seen from the foregoing that the means herein disclosed for positively locking the sleeves 10 and 11 together is extremely simple in construction and easy to operate both in securing the sleeves together and releasing them.

While it has been stressed herein in the specification and claim that the sleeves 10 and 11 are positively locked together so that they will not separate under a direct pull, it should be understood that this means that they will not separate unless subjected to a direct axial pull so great that it will distort the springs 14 beyond their intended operating condition. If the separating force exerted on the sleeves is far beyond the strength for which the springs 14 were designed, they will be bent or sprung to the sleeve releasing position.

Having thus described our invention, what we claim and desire to protect by Letters Patent is:

A coupling comprising a pair of interfitted sleeves adapted to be turned one in the other and to be moved axially into and out of interfitted relation, means for holding the sleeves together without restricting their relative rotation, including an annular shoulder on one sleeve and leaf springs secured to the other sleeve and having projections adapted to engage said shoulder when the sleeves are interfitted to lock them together, each spring having the active face of its projection disposed at slightly more than ninety degrees to the longitudinal axis of the coupling so that such active faces will not slide upon said shoulder to release the sleeves under a direct axial pull but will slide upon said shoulder along a spiral path to release the sleeves as a result of the inclination of the projections if one sleeve is rotated relative to the other during said pull.

BOUTWELL H. FOSTER.
HERBERT E. SUNBURY.